United States Patent Office 3,054,688
Patented Sept. 18, 1962

3,054,688
NON-FROSTING FROZEN PACKAGE COATING
Garth H. Beaver and Harold C. Kelly, Midland, Mich., assignors to The Dow Chemical Company, Midland, Mich., a corporation of Delaware
No Drawing. Filed Aug. 19, 1960, Ser. No. 50,572
8 Claims. (Cl. 106—180)

The present invention relates to novel thermoplastic compositions of matter and is more particularly concerned with novel "hot melt" type coatings for frozen packages which will not frost, and have excellent anti-slip properties.

We have found that hot-melt compositions containing from 5 to 35 weight percent, preferably from 20 to 26 weight percent of a low ethoxy ethylcellulose and, correspondingly, from 95 to 65, preferably 80 to 74 weight percent of certain water soluble, high boiling polyol derivatives produce films which are dry at room temperature and which have good strength, elongation, and elasticity and are able to preclude formation of frost crystals, thereby preventing the frosting of frozen packages when removed from a freezer or stored in an open air display freezer.

As a further advantage, a frozen package overcoated in accordance with the present invention exhibits a significant degree of tack or attraction between packages without the formation of permanent bonds so that excellent stacking of uneven packages can be obtained.

The low ethoxy ethyl celulose should contain from about 30 to about 45 percent ethoxy groups for the most beneficial results. The water soluble high boiling polyol derivatives which are suitable are humectant hot solvents and include, for example, the glyceryl acetates, hydroxypropyl glycerols, hydroxypropyl sorbitols, propylene glycol, trimethylol propane, monohydroxypropyl trimethylol propane, and the like. The low ethoxy ethyl celluloses are soluble in these polyol derivatives when hot, but insoluble when at room temperature or below.

The hot melt coatings of this invention may be applied at any temperature from about 140 to 250° C. by any conventional means such as spraying, dipping or brushing. The coating thickness may be from about 2 to about 15 mils, and is preferably from about 3 to 8 mils.

The present invention may be further understood, but is not to be construed as limited, by the following examples.

Example I

A mixture of 115 grams of glycerol, hydroxypropylated to an average degree of substitution of 2.5, and 34 grams of 35.3 percent ethoxy content ethyl cellulose was heated with agitation at 215° C. until molten. The mixture was then applied as a topcoating to a frozen meat package having an undercoat of a composition consisting essentially of 49 percent ethoxy ethyl cellulose and mineral oil prepared as in U.S. Patent 2,840,476 by dipping. The topcoat hardened within a few seconds. It was dry to the touch and had good strength characteristics. The package was stored in a freezer for 24 hours and did not frost when removed therefrom and placed at ambient room conditions to thaw, or when it was placed in an open air display freezer. The film was continuous and had not cracked, peeled or chipped away from the substrate film indicating excellent low temperature flexibility characteristics. Similar characteristics were noted after a series of freeze-thaw experiments.

Example II

Following the procedure of Example I the following solvents were used in place of the hydroxypropylated glycerol with various low ethoxy ethyl celluloses as indicated:

| Run | Solvent | Solubility Temp. (° C.) | Percent Ethoxy in Cellulose Ether |
|---|---|---|---|
| 1 | Acetin | 165 | 39.4 |
| 2 | Diacetin | 165 | 35.3 |
| 3 | Triacetin | 175 | 35.3 |
| 4 | Propylene Glycol | 145 | 35.3 |
| 5 | Hydroxypropyl sorbitol (DS 4). | 220 | 35.3 |
| 6 | Trimethylol Propane | 155 | 35.3 |
| 7 | Monohydroxy-propyl trimethylolpropane. | 145 | 35.3 |

All of the above coatings prevented "frosting" and did not become slimy. The formulations were compatible, and provided continuous films.

The topcoating of Run No. 2 was tested for slip angle according to TAPPI Routine Control Tests, Nos. 34, 35. A 100 gram sample had a slip angle of greater than 45° C.

Various modifications may be made in the present invention without departing from the spirit or scope thereof, and it is understood that we limit ourselves only as defined in the appended claims.

What is claimed is:
1. A thermoplastic coating composition consisting essentially of 5 to 35 weight percent of an ethylcellulose containing from 30 to 45 percent ethoxyl groups and, correspondingly, from 95 to 65 weight percent of a humectant hot solvent of the group consisting of hydroxypropylated glycerol, propylene glycol, glyceryl diacetate, glyceryl monoacetate, trimethylol propane and monohydroxypropyl trimethylol propane.
2. Composition of claim 1 wherein the coating contains from 20 to 26 weight percent of said ethyl cellulose.
3. Composition of claim 1 wherein the humectant hot solvent is a hydroxypropylated glycerol.
4. Composition of claim 1 wherein the solvent is propylene glycol.
5. Composition of claim 1 wherein the solvent is glyceryl diacetate.
6. Composition of claim 1 wherein the solvent is glyceryl monoacetate.
7. Composition of claim 1 wherein the humectant hot solvent is trimethylol propane.
8. Composition of claim 1 wherein the humectant hot solvent is monohydroxypropyl trimethylol propane.

References Cited in the file of this patent
UNITED STATES PATENTS

| | | |
|---|---|---|
| 2,810,659 | Greminger et al. | Oct. 22, 1957 |
| 2,840,485 | Greminger et al. | June 24, 1958 |
| 2,849,328 | Swinehart et al. | Aug. 26, 1958 |
| 2,917,397 | Wixcox | Dec. 15, 1959 |